United States Patent [19]

Budin et al.

[11] Patent Number: 4,992,641
[45] Date of Patent: Feb. 12, 1991

[54] APPARATUS FOR PREPARING A MACHINING LIQUID OF AN ELECTROEROSION MACHINE

[76] Inventors: Josef Budin, Via Cadogno 3, 6648 Minusio; Hugo Kutil, Zypressenstrasse 17, 8408 Winterthur; Gideon Levy, Via Locarno 52, 6616 Losone, all of Switzerland

[21] Appl. No.: 395,730

[22] Filed: Aug. 18, 1989

[30] Foreign Application Priority Data

Aug. 19, 1988 [DE] Fed. Rep. of Germany ....... 3828237

[51] Int. Cl.$^5$ .......................... B23K 3/10; B23K 1/10; B23K 7/36
[52] U.S. Cl. .................................. 219/69.14; 204/238; 204/240; 204/DIG. 13; 210/259; 210/651; 210/195.2
[58] Field of Search ....... 204/237, 238, 240, DIG. 13; 219/69.14; 210/259, 651, 652, 195.2

[56] References Cited

U.S. PATENT DOCUMENTS

| | | | |
|---|---|---|---|
| 2,981,822 | 4/1961 | Larkins, Jr. .................... | 219/69.14 |
| 3,067,358 | 12/1962 | De Maine ..................... | 219/69.14 X |
| 3,239,438 | 3/1966 | Voorhees ...................... | 204/238 X |
| 3,255,097 | 6/1966 | Williams ........................ | 204/237 X |
| 3,553,415 | 1/1971 | Girard ............................ | 219/69.14 |
| 4,132,650 | 1/1979 | Kirsch et al. ................. | 210/505 |
| 4,626,332 | 12/1986 | Inoue ...................... | 204/DIG. 13 X |
| 4,859,324 | 8/1989 | Levy et al. ................... | 210/195.2 |

FOREIGN PATENT DOCUMENTS 0073234 4/1984 Japan ............................... 219/69.14

Primary Examiner—Donald R. Valentine

[57] ABSTRACT

An apparatus for preparing and cleaning a machining liquid of an electroerosion machine comprises a filter, to which a concentrate flow is supplied from a concentrate tank and from which a permeate flow is drained off. Over a considerably extended time the quality of the machining liquid is maintained within a desired quality range, because the filter is constructed as a membrane filter and a disposal container having a fleece filter is provided to which is supplied at least part of the concentrate flow from the membrane filter and from which the partial flow filtered through the fleece filter is returned to the concentrate tank.

10 Claims, 3 Drawing Sheets

APPARATUS FOR PREPARING A MACHINING LIQUID OF AN ELECTROEROSION MACHINE

BACKGROUND OF THE INVENTION

The present invention relates to an apparatus for preparing a working, processing or machining liquid of an electroerosion machine.

Electroerosion machines have a working container filled with a machining liquid in which a workpiece to be machined by electroerosion is immersed. In wire cutting or wire erosion machines, the machining liquid consists of deionized water, whereas in the case of countersinking machines it consists of hydrocarbons. As the erosive removal of particles from the workpiece takes place there is an eventual reduction in the cleanness of the machining liquid, so that its electrical conductivity changes. In order to maintain a desired quality of the erosion process, it is necessary to clean the machining liquid so as to maintain its electrical characteristics and cleanness within predetermined ranges.

Conventional filters are typically used for the preparation of the machining liquid, which have a comparatively large pore diameter. In the case of the large pore sizes of such conventional filters the filtering action is not adequate to maintain the quality of the machining liquid of an electroerosion machine within a desired quality range for a period of several days. A reduction in the pore diameter of conventional filters for increasing the filtering quality leads to the clogging of the filter walls.

It is generally known in the field of filter technology to use membrane filters, which have an extremely small pore cross-section compared with the pore sizes of conventional filters. However, membrane filters have been considered unsuitable for the coarse filtering of the concentrate in electroerosion, because as a result of the high solids content in the concentrate, there has been always fear for of a rapid clogging of the membrane filter.

Therefore membrane filters have only been used for extremely specialized purposes but have never been used for cleaning the concentrate in electroerosion machines. JP-OS 62-24917 discloses an apparatus for preparing a machining liquid of an electroerosion machine, in which a membrane filter is used. The known apparatus comprises a container for the machining liquid, which is subdivided by a cellophane membrane into two areas. The first area is connected by means of a pump, with which is connected in series a conventional filter, to the working area of the electroerosion machine. This working area can be, by means of a further pump, again discharged into the first area of the container. The second area of the container is connected by means of a yet another pump to an ion exchanger. The ion concentration in the second container area is well below the ion concentration in the first container area so that the ion exchanger can be operated with a low ion density favorable for its operating behavior. In the case of this known apparatus for preparing a machining liquid, a conventional filter is used for filtering the concentrate, whereas a membrane filter is used only for the adjustable reduction of the ion density for an ion exchanger circuit and not for cleaning or preparing the concentrate.

SUMMARY OF THE INVENTION

It is an object of the present invention to provide an improved apparatus for preparing a machining liquid of an electroerosion machine in such a way that it is possible to maintain a high quality of the machining liquid for electroerosion over a long period of time.

This and other objects of this invention are attained by an apparatus for preparing a machining liquid, comprising a membrane filter and a disposal container connected thereto and receiving therefrom at least a partial flow of concentrate and including a fleece filter for filtering said partial flow which is returned to a concentrate tank.

The present invention is based on the finding that, contrary to the opinion hitherto held by the experts in the field of electroerosion technology, a membrane filter can be used for concentrate cleaning if at least part of the concentrate flow removed from the concentrate tank is passed to a disposal container provided with a fleece filter, through which the partial concentrate flow is pre-purified by filtering out solids before the pre-purified partial flow is returned to the concentrate tank. As a result of the inventive combination of the membrane filter with a partial disposal of the concentrate tank brought about by the fleece filter, it is possible to maintain in the concentrate tank such a low solids concentration that the membrane filter can be used for cleaning the concentrate without occurring any clogging of the membrane filter.

Thus, the cleaning of the liquid is fundamentally brought about by the membrane filter, whereas the fleece filter serves to dispose of the dirt particles from the machining liquid circuit.

A major advantage of the inventive combination of the membrane filter and the fleece filter is that the solids from the concentrate accumulate above the fleece filter to form a filter cake, which leads to a further increase in the filtering action of the fleece filter with respect to the solids in the concentrate.

Particular significance is attached to the fact that the solids which accumulate to a filter cake on the fleece filter only have a comparatively low moisture content or can, in fact, be present in a substantially dry form, so that it is easy to dispose of these solids together with the filter fleece.

It is particularly advantageous if the disposal discharge of the dirt or concentrate circuit is carried out in a discontinuous manner, namely by carrying out a backflushing of the membrane filter. The frequency of backflushing or the time at which this is carried out can be determined indirectly from electroerosion process parameters, particularly the time integral of the flame cutting current of the electroerosion machine. Thus, in the case of a constant flame cutting voltage, the removal capacity and therefore also the amount of dirt particles produced is dependent on the electric power consumed in the working gap.

If, as a function of these parameters, the cleaning of the membrane filter is also controlled and which can be achieved individually or in combined manner by a backflushing of the membrane filter and a concentrate flow direction reversal through the membrane filter, then it is particularly advantageous to increase the partial flow to the disposal container if shortly beforehand such a membrane filter cleaning has been started, because then there is a particularly high solids concentration in the concentrate circuit.

The aforementioned objects, features and advantages of the invention will, in part, be pointed out with particularity, and will, in part, become obvious from the fol-

DETAILED DESCRIPTION OF THE PREFERRED EMBODIMENT

Figure 1:
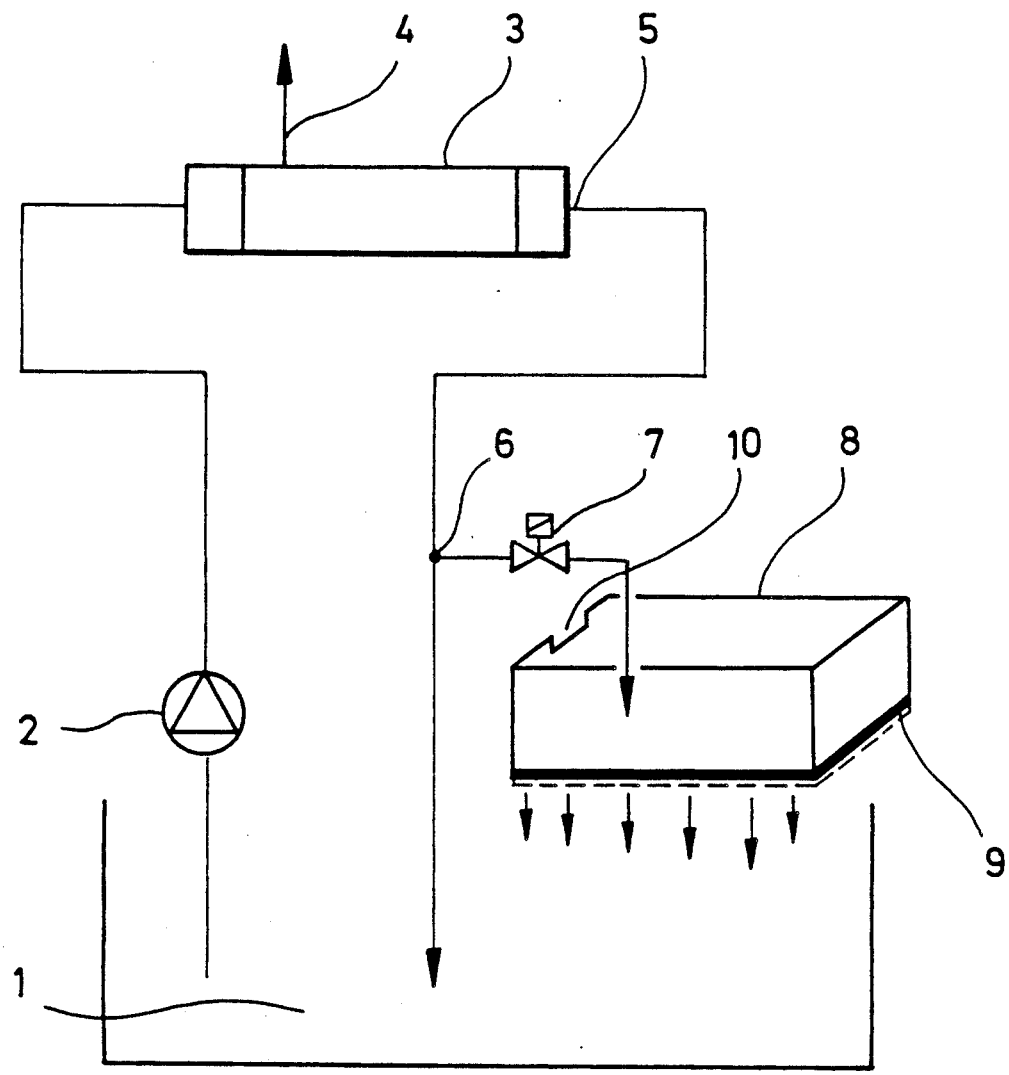
FIG. 1 is a diagrammatic view illustrating a part of an apparatus for preparing a machining liquid of an electroerosion machine according to the invention.

An apparatus for preparing a machining liquid of an erosion machine comprises a concentrate tank 1, which is diagrammatically shown in FIG. 1. A pump 2 delivers a concentrate flow from the concentrate tank 1 to an inlet connection 5a of a membrane filter 3, from which a permeate is drained off at a permeate outlet 4. From a concentrate outlet 5b the concentrate flow enriched again with solids, following the branching off of the permeate, is returned to the concentrate tank 1 via a line 31 as will be explained in detail in connection with FIG. 3. Part of the returned concentrate flow is supplied downstream of a branch 6 by an electrically operable conventional flow valve 7 to a disposal container 8. Disposal container 8 is constructed as a wire basket, in which is placed a fleece filter 9. The latter can be a fleece bag or mat which covers the bottom of the disposal container 8 as a sieve or screen on its base surface. The disposal container 8 is arranged above the concentrate tank 1 in such a way that the partial concentrate flow which has passed through the fleece filter bag 9 of container 8 is returned to the concentrate tank 1. During the filtration process a filter cake builds up on the surface of the fleece filter 9, which comprises accumulated solids separated from the concentrate. This filter cake reinforces the filtering action of the fleece filter 9.

According to a modification of the invention, the disposal container 8 is provided with an overflow 10, which permits a concentrate overflow to flow from disposal container 8 into the concentrate tank 1, if the partial concentrate flow supplied to container 8 is greater than the pre-purified concentrate quantity which has trickled through the filter cake and fleece filter 9.

By controlling the partial flow valve 7, it is possible to modify the partial flow quantity in such a way that either periodically or discontinuously varying partial flow quantities per unit of time can be supplied to the disposal container 8 from line 31.

In practice, smaller partial flow quantities are continuously supplied to disposal container 8. Preference is given to a discontinuous increase in the partial flow to the disposal container 8 and this advantageously always takes place when the concentration of the impurities has reached a predetermined value, which is indirectly determined from parameters of the electroerosion process, particularly the time integral of the flame cutting current. As a backflushing of the membrane filter is carried out as a function of said parameter, it is possible that the increase in the partial flow quantity to the disposal container be also initiated directly as a function of the backflushing process, because through a brief backflushing of the membrane filter, dirt particles will be forced away from the membrane filter wall and entrained by the concentrate flow, so that there will be an increased dirt particle concentration in this phase of the process. A cleaning action is also obtained in that the flow direction of the concentrate flow through the membrane filter be reversed at specific time intervals, because dirt particles tend to collect at the membrane filter inlet. In the case of a flow reversal the previous filter inlet becomes the filter outlet so that particles deposited there will be entrained by the concentrate flow.

The concentration of dirt particles is particularly high in these "cleaning phases" so that it is appropriate then to increase the quantity of the partial flow to the fleece filter.

Figure 2:
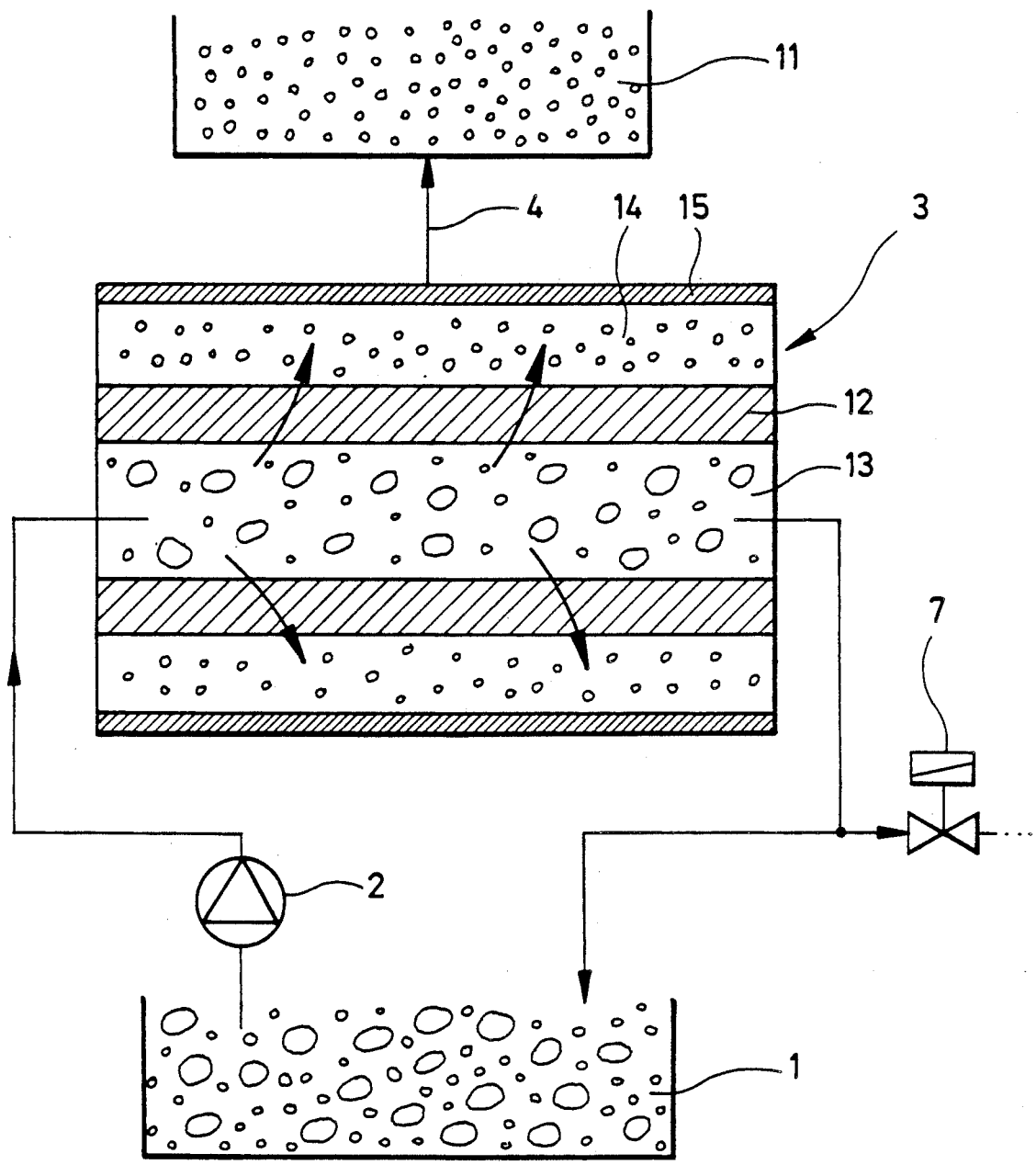
FIG. 2 is a sectional view through a membrane filter, used in an apparatus according to FIG. 1.
Figure 3:
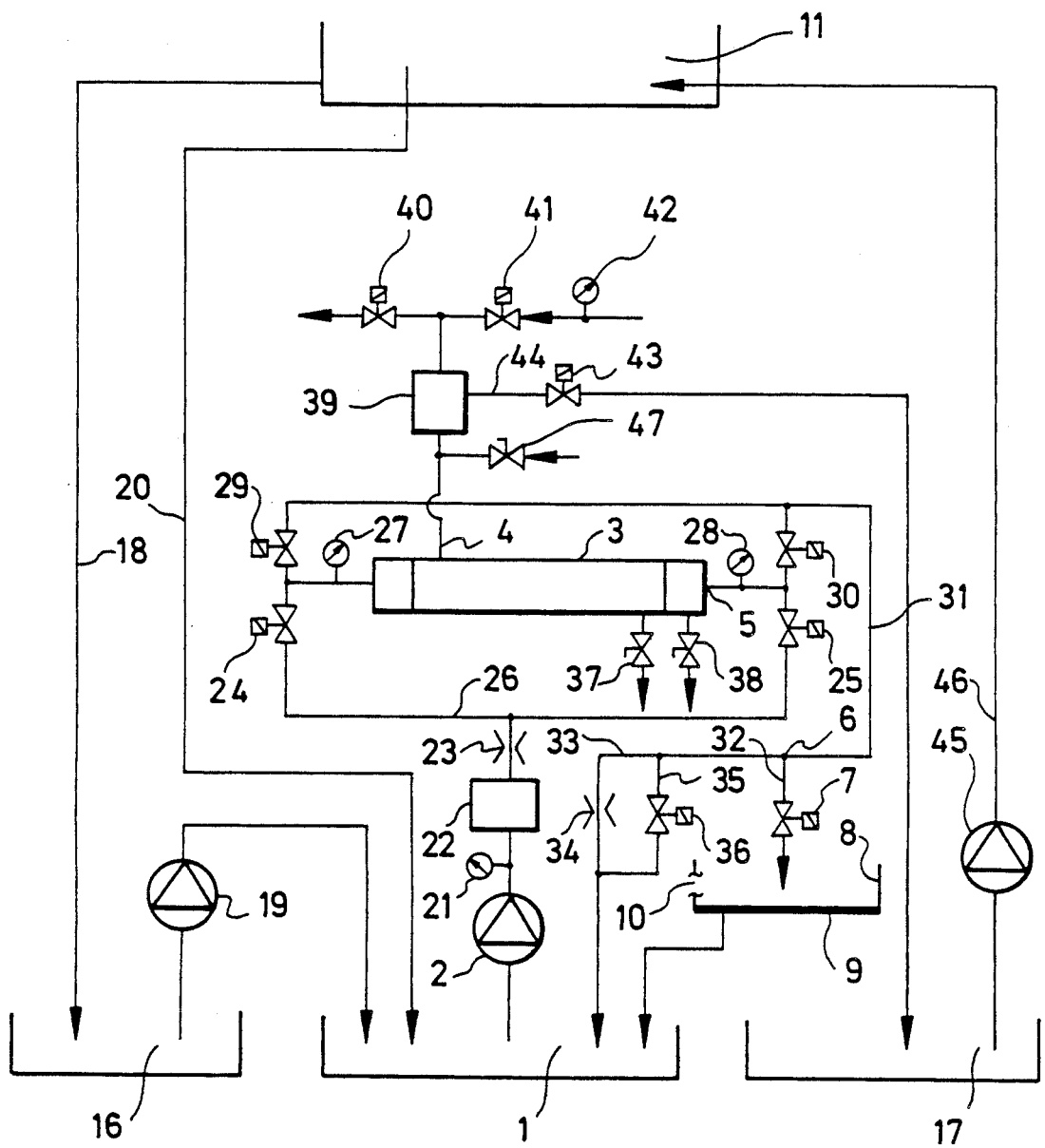
FIG. 3 is an overall diagrammatic view of an apparatus for preparing the machining liquid of an electroerosion machine according to the invention.

As can be seen in FIG. 2, the permeate outlet 4 of the membrane filter 3 is connected to a permeate container or clean liquid tank 17 from which the permeate is pumped into a spark erosion machine working container 11 (cf. FIG. 3). In the preferred embodiment shown in FIG. 2, the membrane filter 3 has a tubular membrane 12, which separates a concentrate area 13 from a permeate area 14. Membrane filter 3 is enclosed with a cylindrical housing wall 15.

The drawings show a single membrane filter 3, but according to a preferred embodiment a plurality of identical filter elements 3 are arranged in parallel flow connection. As a result of the construction of the membrane filter as a plurality of rod-like filter elements, it is possible to obtain a large filter surface with minimum space requirements.

The membrane filter 3 preferably is comprised of hollow polypropylene fibers having a diameter of approximately 1.5 mm and a pore size of approximately 0.2 $\mu$m.

FIG. 3 shows a detailed schematic view of the overall arrangement of a practically realized apparatus for preparing a machining liquid of an electroerosion machine. Reference numerals coinciding with those used in FIGS. 1 and 2 designate identical or similar parts.

In addition to the working container 11 and the concentrate tank 1, the apparatus comprises a receiver or collecting container 16 and the clean liquid tank 17. The content of working container 11 can be supplied to the receiver 16 by means of a drain line 18. By means of a second pump 19, the content of receiver 16, can be pumped round into concentrate tank 1 following sedimentation of the concentrate. The working container 11 is also directly connected to the concentrate tank 1 via a return flow line 20. Downstream of the first pump 2, is provided a pressure gauge 21, a coarse filter 22 and a shield or screen 23, behind which a feed line 26 is subdivided into two branches which lead to two inlet valves 24, 25. The first inlet valve 24 is connected to the membrane filter 3 on one side thereof, whilst the other inlet valve 25 is connected to the filter 3 on its other side. The pressure upstream and downstream of the membrane filter 3 is monitored by a second and a third pressure gauge 27, 28. In addition to the inlet valves 24, 25, to the concentrate area 13 of membrane filter 3 are also connected outlet valves 29, 30, which are in turn connected to concentrate tank 1 via the concentrate return flow line 31. Line 31 is split up at the partial flow valve 7 into a disposal container line 32, a shield line 33 containing a shield 34 and opening into the concentrate tank 1 and a pressure relief line 35 having a dirt-side pressure relief valve 36 and also extending to the concentrate tank 1.

The inlet valves 24, 25 and outlet valves 29, 30 are controlled in such a manner that, on opening of the inlet valve 24, the inlet valve 25 is closed, whilst outlet valve 30 is open and the outlet valve 29 facing the first inlet valve 24 is closed. As a result of this valve opening and closing combination, a flow direction is fixed, which runs from left to right in FIG. 3. A reversal of the direction of the flow through the membrane filter 3 can be brought about in that inlet valve 25 and outlet valve 29 are opened, whilst inlet valve 24 and outlet valve 30 are closed.

As a result of the flow direction reversal, the membrane filter 3 is cleaned, which simultaneously leads to an accumulation of dirt particles in the dirt circuit. In such phases of increased dirt concentration in the dirt circuit, it is appropriate to pass the entire flow of the dirt circuit or at least a larger proportion thereof over the fleece filter 9.

Membrane filter 3 also has two drain valves 37, 38. The permeate outlet 4 of membrane filter 3 is connected to a buffer container 39 for the backflushing of membrane filter 3. Buffer container 39 can be vented by means of a vent valve 40 and for cleaning the membrane filter 3 can be subjected to the action of compressed air through a compressed air valve 41, whose pressure can be monitored by a fourth pressure gauge 42.

This backflushing leads to the cleaning of the membrane filter 3 and therefore to increased dirt concentration in the dirt circuit. Following onto such backflushing phases, it is advantageous to allow all or significant parts of the concentrate flow to pass over the fleece filter 9.

Buffer container 39 is connected to clean liquid tank 17 via a return line 44, which has a return valve 43. The permeate which has accumulated in clean liquid tank 17 is returned by means of a third pump 45, via a permeate line 46 to the working container 11. This permeate return to the working container preferably takes place with a delivery of approximately 50 to 60 liters/minute.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. In a combination of an electroerosion machine including a working container filled with a machining liquid with an apparatus for preparing the machining liquid connected with the working container of the electroerosion machine, the apparatus comprising a concentrate tank to which the machining liquid to be prepared is supplied from said working container; a filter to which a concentrate flow is supplied from said concentrate tank and from which a permeate flow is drained; a permeate container connected to said filter to receive a permeate of said machining liquid therefrom and also connected to said working container by a permeate line to supply the permeate of said machining liquid thereto; said filter being a membrane filter; and a disposal container provided with a fleece filter and being in communication with said membrane filter so that at least a partial concentrate flow is supplied from said membrane filter to said disposal container, from which the partial flow prepared by the fleece filter is returned to said concentrate tank.

2. Combination according to claim 1, wherein said fleece filter is constructed as a fleece filter bag, in which a filter cake reinforcing a filtering action of the fleece filter can build up.

3. Combination according to claim 2, wherein said disposal container is arranged above said concentrate tank, whereby a concentrate flows back into said concentrate tank after trickling through the filter cake and said fleece filter.

4. Combination according to claim 3, wherein said disposal container has an overflow leading to said concentrate tank.

5. Combination according to claim 1, wherein said fleece filter is constructed as a fleece filter mat, on which a filter cake increasing a filtering action of the fleece filter can build up.

6. Combination according to claim 1, further comprising means for supplying a partial concentrate flow to said disposal container and means for conveying said partial concentrate flow back to said concentrate tank from said membrane filter supplied with a concentrate from said concentrate tank by a pump.

7. Combination according to claim 1, wherein said membrane filter includes a tubular membrane filter wall and is supplied with a concentrate from said concentrate tank by a pump in circuit form substantially tangentially to said membrane filter wall so that by a transverse flushing of said wall with the concentrate having a low solids concentration resulting from passing through said fleece filter, a build-up of excessively thick layers of a filter cake on said membrane filter wall is prevented.

8. Combination according to claim 1, and further comprising a disposal container line leading to said disposal container and containing therein a controllable solenoid valve which is opened or closed as a function of parameters of an electroerosion process.

9. Combination according to claim 8, wherein said solenoid valve is operated so that it is opened during a backflushing of said membrane filter and following onto a reversal of a direction of the concentrate flow through said membrane filter.

10. Combination according to claim 1, wherein said disposal container includes a wire basket.

* * * * *